US006827169B1

(12) United States Patent
Van Hout et al.

(10) Patent No.: US 6,827,169 B1
(45) Date of Patent: Dec. 7, 2004

(54) FORCE DISTRIBUTING TOP MOUNT BATTERY RETENTION SYSTEM

(75) Inventors: James E Van Hout, Auburn Hills, MI (US); Gregory N Corey, Farmington Hills, MI (US); Narinder Pal Singh, Windsor (CA); Zdzislaw J Skorupa, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/632,259

(22) Filed: Aug. 1, 2003

(51) Int. Cl.$^7$ .............................................. B60R 16/04
(52) U.S. Cl. ........................ 180/68.5; 248/503; 248/544
(58) Field of Search ................................ 248/503, 500, 248/510, 310, 313, 303; 180/68.5

(56) References Cited

U.S. PATENT DOCUMENTS

| | | | |
|---|---|---|---|
| 2,022,595 A | 11/1935 | Gowing | |
| 3,557,895 A * | 1/1971 | Thomas ..................... | 180/68.5 |
| 3,752,254 A | 8/1973 | Carley et al. | |
| 4,495,787 A | 1/1985 | Comstock | |
| 4,515,233 A | 5/1985 | Silverstein | |
| 4,520,887 A * | 6/1985 | DiFazio ..................... | 180/68.5 |
| 4,535,863 A * | 8/1985 | Becker ...................... | 180/68.5 |
| 4,565,256 A | 1/1986 | Valdez | |
| 5,040,627 A | 8/1991 | Swayze | |
| 5,052,198 A | 10/1991 | Watts | |
| 5,086,860 A | 2/1992 | Francis et al. | |
| 5,222,711 A | 6/1993 | Bell | |
| 5,377,947 A * | 1/1995 | Johnson ..................... | 248/503 |
| 5,415,956 A * | 5/1995 | Ching ....................... | 429/187 |
| 5,547,036 A | 8/1996 | Gawaskar et al. | |
| 5,734,556 A * | 3/1998 | Saneinejad et al. ......... | 361/179 |
| 6,161,810 A | 12/2000 | Crow et al. | |
| 6,343,015 B1 * | 1/2002 | Huang et al. ............... | 361/704 |

* cited by examiner

Primary Examiner—Ramon O Ramirez
(74) Attorney, Agent, or Firm—Ralph E. Smith

(57) ABSTRACT

A battery mounting system includes a bracket mounted to the automobile frame, a battery tray mounted to the bracket, and a battery retention assembly comprising a formed rod spanning the battery and attaching to the bracket, and a top mount molding adapted to distribute the retention force over the upper surface of the battery. The top mount molding has a substantially flat lower surface for contacting the battery, with a cut-out portion for receiving the caps of the battery cells, and an arcuate upper surface with a center receptacle for receiving the spanning rod. The receptacle is formed by a peripheral wall having opposing slots for directing the rod; the wall also has indexing slots for adapting the mounting system to more than one battery height. The molding also includes laterally extending ears at the surface of the battery for centering the molding between upstanding battery posts.

10 Claims, 6 Drawing Sheets

FORCE DISTRIBUTING TOP MOUNT BATTERY RETENTION SYSTEM

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The invention relates to a system for mounting and retaining any one of a number of batteries adaptable for use in an automobile.

2. Description of Related Art

Automobiles require a source of electrical power to generate a motive force and to operate auxiliary components and accessories. During operation, an alternator driven by the engine of the automobile provides this power, but a battery is generally required to provide this power to start the engine and to operate the accessories when the engine is not running.

This battery is generally mounted in the engine compartment, a region of generally high temperature and vibration. These environmental conditions can adversely affect the operation and longevity of a battery. Battery mounting systems seek to mount the battery securely within the automobile and to reduce the vibration transmitted to the battery.

Batteries generally take the form of an electrical series of cells. Physically, the battery is a plastic box enclosing a stack of parallel cavities separated by internal walls. Each cavity is generally filled with battery acid. The battery is generally rectangular in plan view, with the internal walls running parallel to the short side of the rectangle. The internal and external walls are relatively thin and tall, and therefore have negligible load bearing capability unless reinforced. The long sides of the battery are reinforced by the internal walls connected thereto. The short sides are generally not reinforced, so they are not capable of bearing as much load as the long sides. It is therefore preferable, when using a top mount system, to direct the load to the long sides of the battery to avoid crushing or cracking the case, or breaking a seal in the case, to avoid a battery acid leak. Leaking battery acid can damage engine compartment components, and can deplete the battery. Because of space constraints within the engine compartment, both for mounting and accessing the mounting system, this has not always been possible with existing mounting systems.

It is also known that batteries are manufactured in a plethora of configurations. When a battery must be replaced, the exact dimensional replacement may not be readily available; a battery that is close in dimension might be made to fit, but the mounting system may not be adaptable to properly secure the new battery.

It would be advantageous to develop a battery mounting system that mounts the battery securely within an engine compartment, is accessible, and is adaptable for distributing the mounting load to the strong sides of the battery case. It would also be advantageous to provide a mounting system that is adaptable to properly securely mount multiple battery configurations, in the event of non-availability of the original battery size.

BRIEF SUMMARY OF THE INVENTION

A battery mounting system includes a cantilevered bracket mounted to the automobile frame, a battery tray mounted to the cantilevered bracket, and a battery retention assembly comprising a formed rod spanning the battery and a top mount molding adapted to distribute the retention force over the upper surface of the battery. The rod is configured on one end with a hook to engage the cantilevered bracket on one side of the battery. The opposing end of the hook has an eye for receiving a bolt threaded into the cantilevered bracket on the opposite side of the battery. The top mount molding has a substantially flat lower surface for contacting the battery, with a cut-out portion for receiving caps covering the battery cells, and an arcuate upper surface with a center receptacle for receiving the spanning rod. The receptacle is formed by a peripheral wall having opposing slots for directing the rod; the wall also has indexing slots for adapting the mounting system to more than one battery height. The molding also includes laterally extending ears at the surface of the battery for centering the molding between upstanding battery posts. The top mount molding is adaptable to multiple battery configurations.

BRIEF DESCRIPTION OF THE SEVERAL VIEWS OF THE DRAWINGS

The present invention will become more fully understood from the detailed description and the accompanying drawings, wherein.

DETAILED DESCRIPTION OF THE INVENTION

Figure 1:
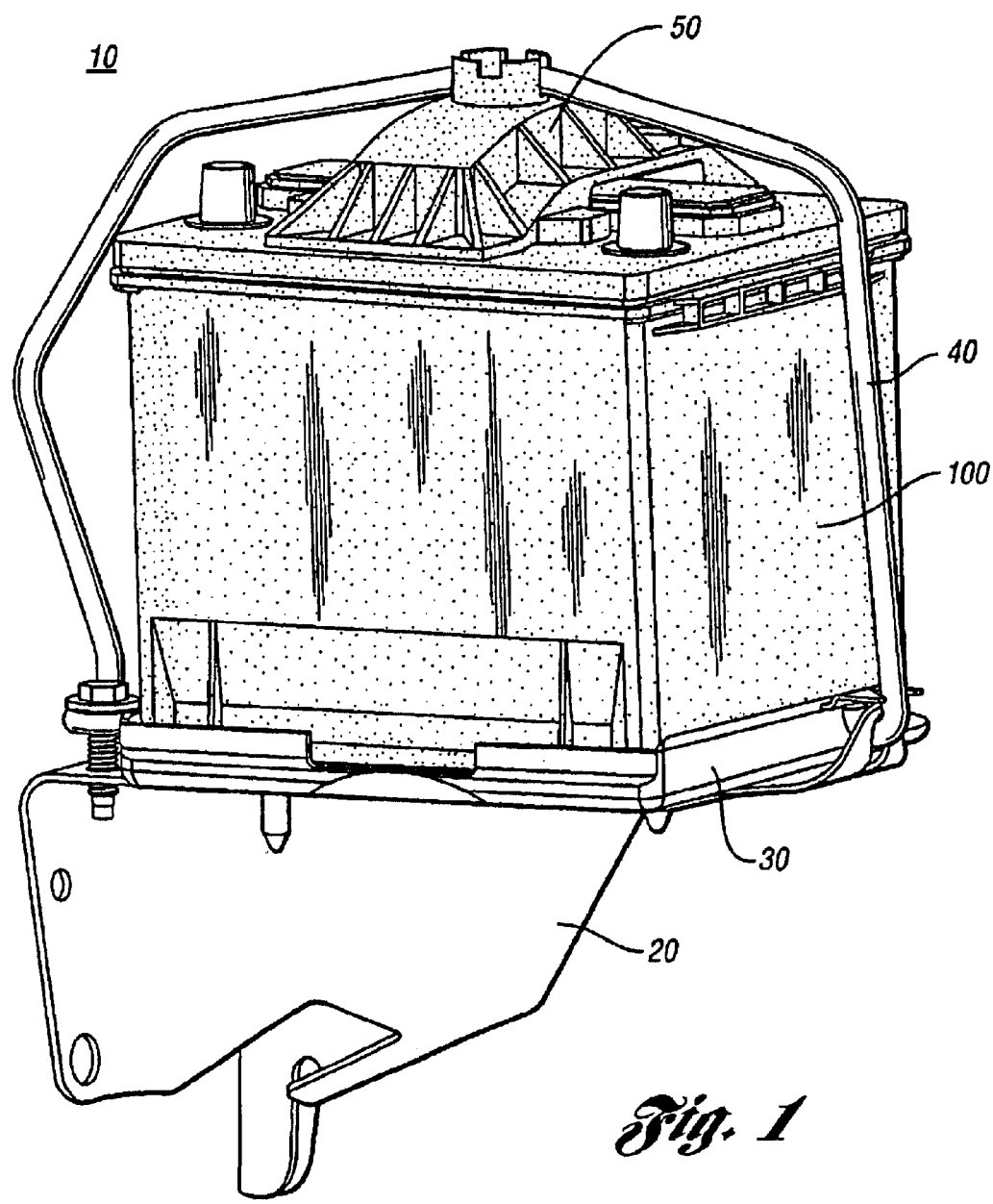
FIG. 1 is a perspective view of a force distributing top mount battery retention system according to the invention.
Figure 2:
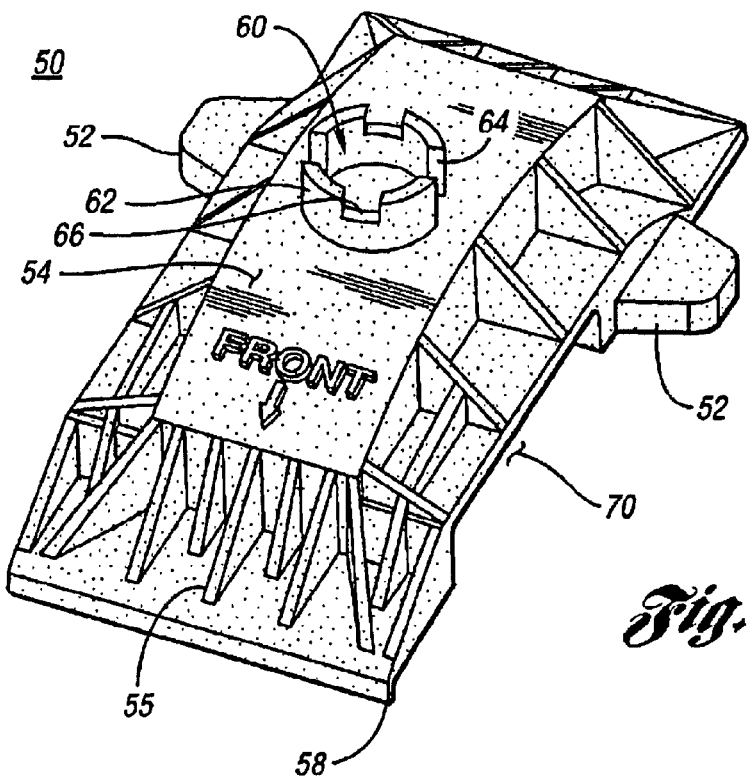
FIG. 2 is a perspective view of a top mount retainer of the retention system of FIG. 1.

Referring to FIG. 1, a force distributing top mount battery retention system 10 according to the invention comprises a mounting bracket 20, a battery tray 30, a retention strap 40 and a top mount retainer 50. The retention system 10 is adapted to securely mount a battery 100 within a vehicle (not shown).

Referring to FIGS. 1–3 and 7–11, the top mount retainer 50 is substantially rectangular in plan view, with two laterally extending ears 52 adapted to center the retainer 50 on the upper surface 102 of the battery 100 between battery terminals 104. The upper surface 54 of retainer 50 is arcuate in cross-section, and includes a centrally located well 60. A plurality of ribs 55 extend longitudinally from upper surface 54 to each end of top mount retainer 50.

The well 60 is an open hollow cylinder defined by a bifurcated peripheral wall 62 which extends upward from retainer upper surface 54. Peripheral wall 62 is bifurcated by a pair of opposed slots 64. The slots 64 are aligned and adapted for receiving the retention strap 40 when the retention system 10 is mounting the battery 100, the retainer 50 being aligned on the upper surface 102 of the battery 100. Peripheral wall 62 further includes a pair of opposed indexing notches 66. Indexing notches 66 define a predetermined height above upper surface 54 of retainer 50.

The lower surface 56 of retainer 50 is substantially flat for contacting upper surface 102 of battery 100, and includes a cavity 70 adapted for receiving battery cell caps 106 extending from battery upper surface 102. A lip 58 extends downwardly from lower surface 56 for aligning the retainer 50 along a sidewall 108 of the battery 100.

Figure 3:
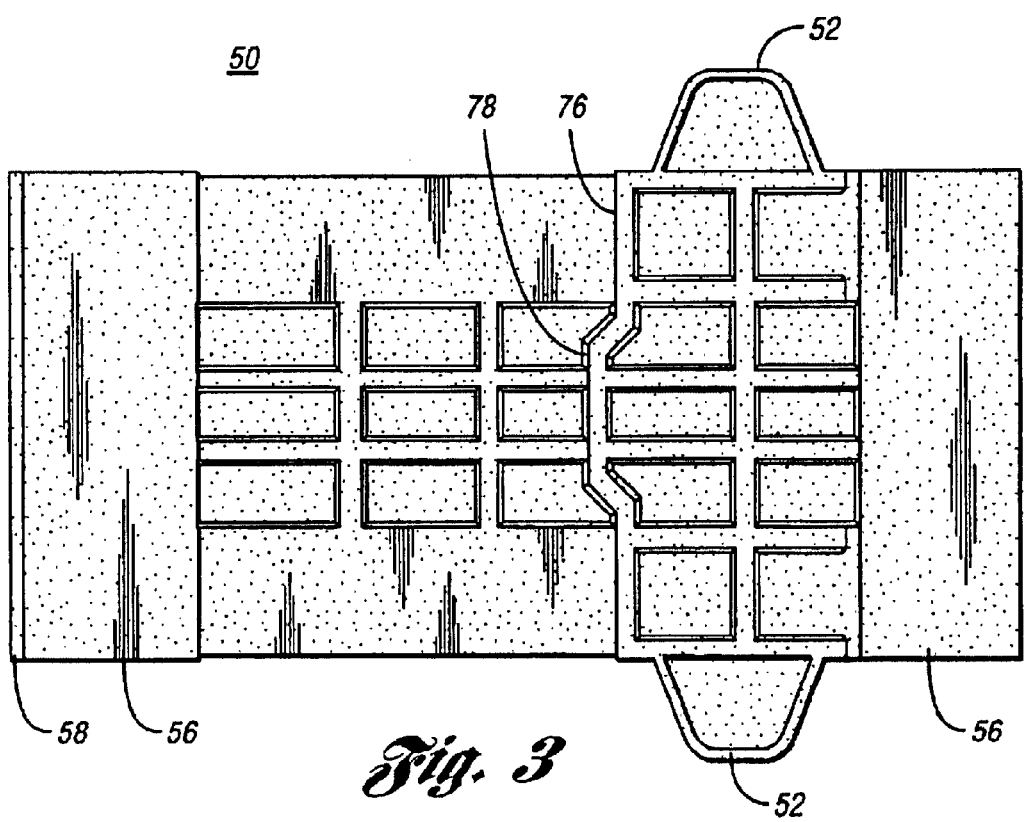
FIG. 3 is a bottom view of the top mount retainer of FIG. 2.

Cavity 70 extends across the full width of retainer 50. The cavity 70 has a depth 72 and a length 74. Referring specifically to FIG. 3, an inner side 76 of cavity 70 includes an alignment projection 78. Alignment projection 78 extends into a gap 110 between caps 106 on battery upper surface 102 for further aligning retainer 50 on battery 100 (see FIG. 8). Lip 58 extends over the edge 112 of battery upper surface 102 when projection 78 is properly aligned in gap 110.

Figure 4:
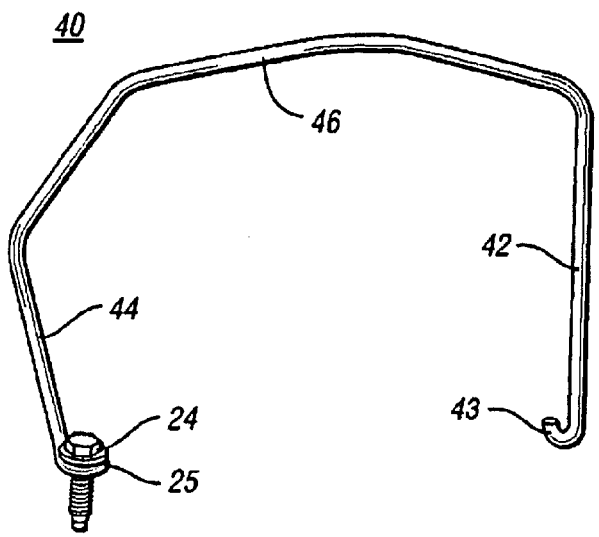
FIG. 4 is a perspective view of a retention strap and fastener of the retention system of FIG. 1.
Figure 6:
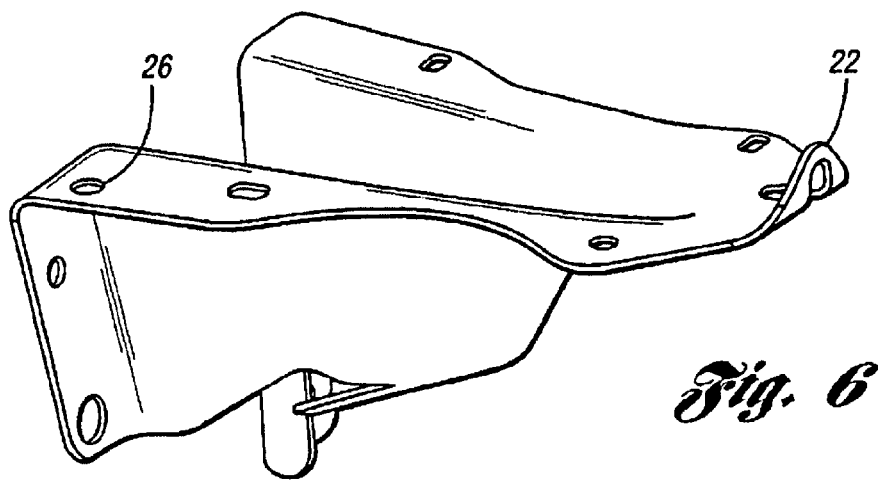
FIG. 6 is a perspective view of a mounting bracket of the retention system of FIG. 1.
Figure 7:
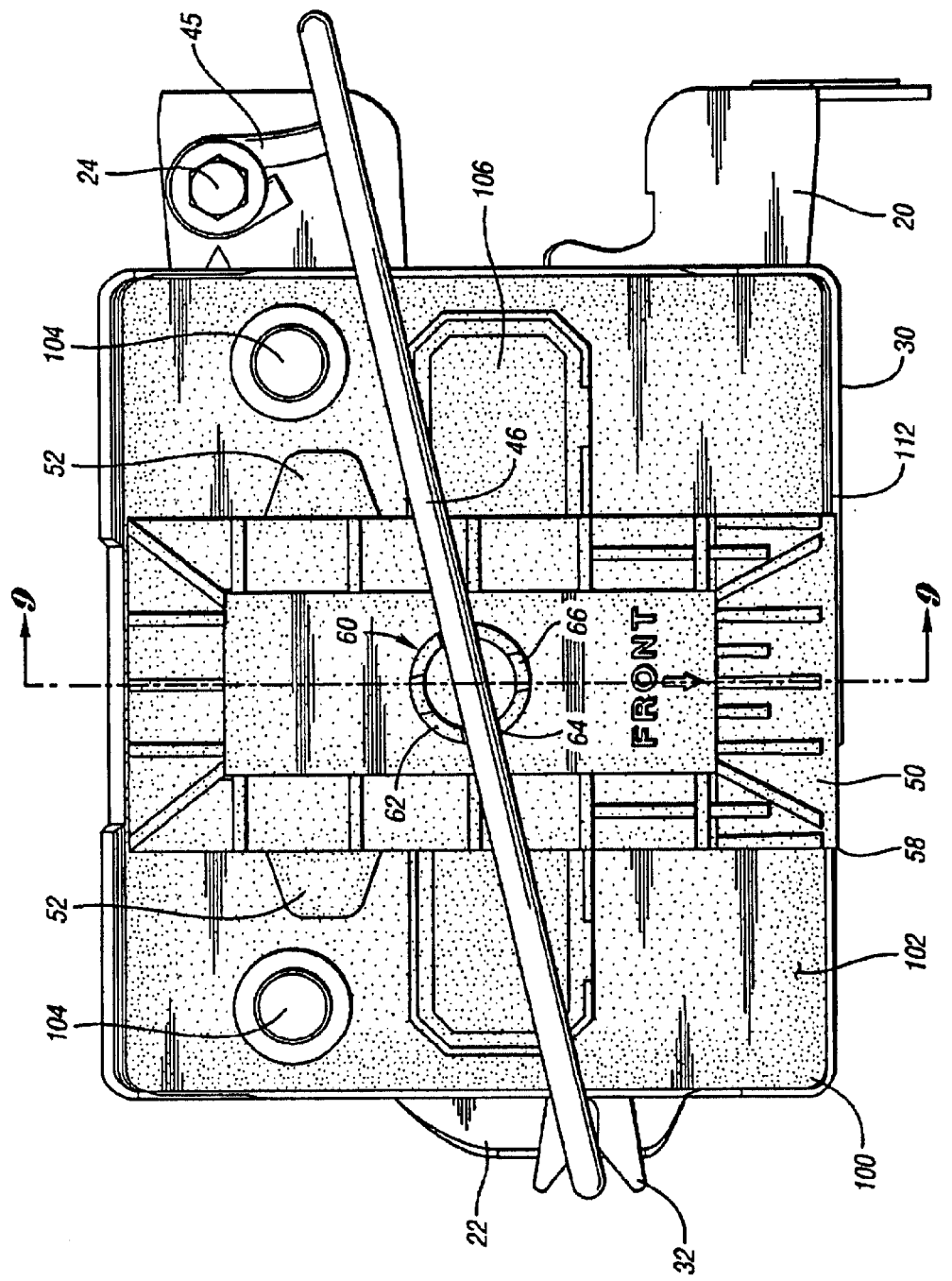
FIG. 7 is a top view of the retention system of FIGS. 1–6.
Figure 8:
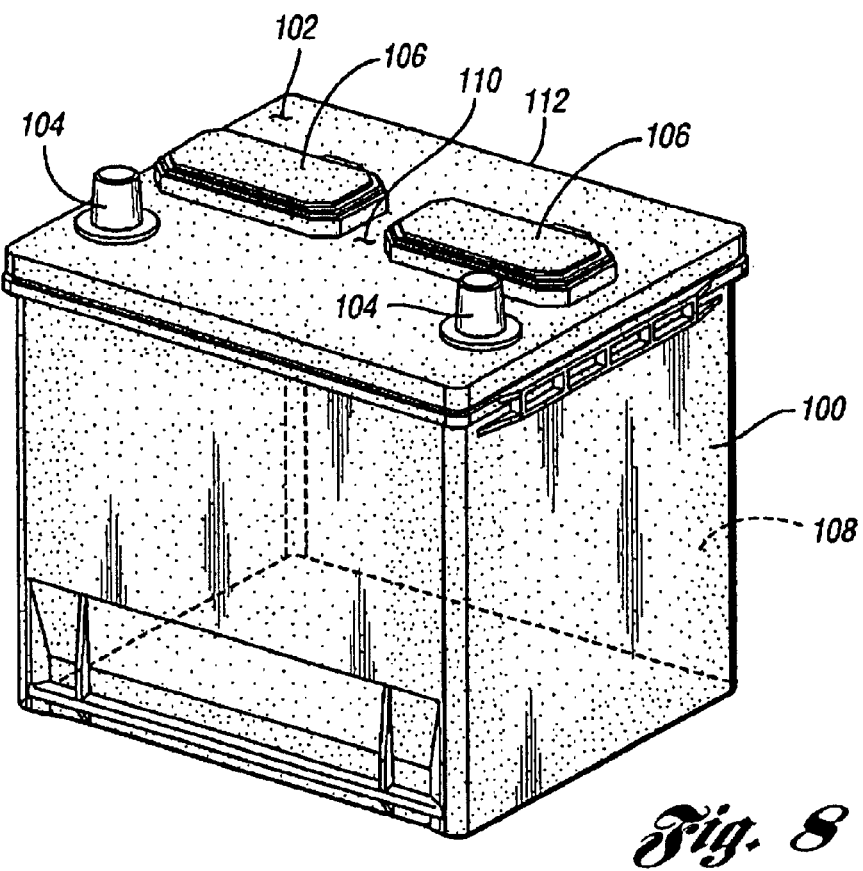
FIG. 8 is a perspective view of a first battery for use with the retention system of FIGS. 1–7.
Figure 9:
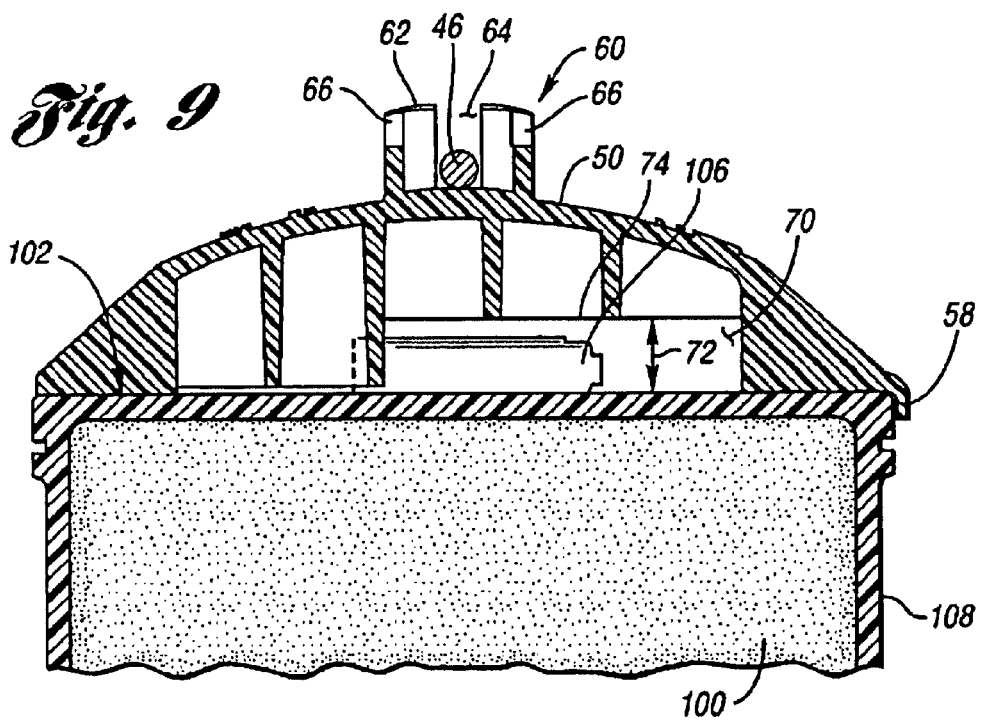
FIG. 9 is a cross-sectional view taken through line 9—9 of FIG. 7.

Retention strap 40 is shown in FIG. 4 as a U-shaped rod integrally formed to span battery 100 and retainer 50. Retention strap 40 includes first and second legs 42, 44 and a generally horizontal center span 46. First leg 42 is terminated by a hook 43 and second leg 44 is terminated by an eye 45. Hook 43 is adapted to engage a perforated flange 22 of bracket 20 (FIG. 6). Eye 45 is adapted for receiving a fastener 24 for engagement to a threaded aperture 26 on an opposing portion of bracket 20. Center span 46 is adapted to pass above battery upper surface 102 from first leg 42 to second leg 44, being retained in position by slots 64 of well 60.

Figure 5:
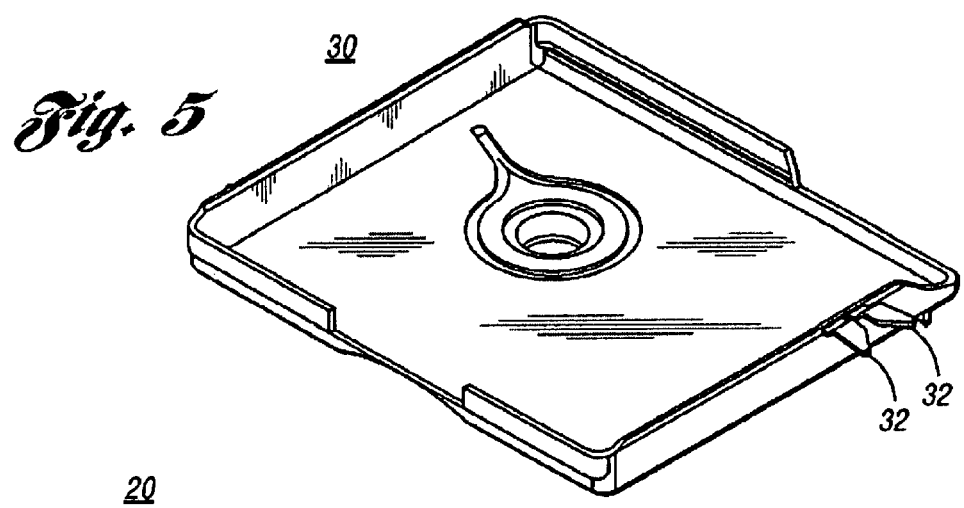
FIG. 5 is a perspective view of a battery tray of the retention system of FIG. 1.

Bracket 20, shown in FIG. 6, is mounted to a vehicle structural element (not shown) and is adapted to receive battery tray 30 (FIG. 5) in a specified alignment. Battery tray 30, shown in FIG. 5, includes outwardly extending retention strap guides 32 adapted to direct first leg 42 and hook 43 of retention strap 40 onto perforated flange 22 of bracket 20.

Battery 100 is then properly placed in battery tray 30, and positive and negative leads (not shown) are attached to terminals 104. Retainer 50 is then placed on upper surface 102 and properly aligned by the cooperation of alignment projection 78 and gap 110, and lip 58 and edge 112. This alignment centers retainer 50 and well 60 over battery 100. In the alternative, where clearance of the leads requires, the retainer 50 and strap 40 can be secured over battery 100 prior to attaching the leads to terminals 104.

Retention strap 40 is then installed over battery 100 and retainer 50. First leg 42 and hook 43 are positively engaged with perforated flange 22. Center span 46 is then aligned over retainer 50 so that is passes through slots 64 of well 60. In tight installation locations, it may be necessary to maneuver strap 40 closely over battery upper surface 102. Strap 40 can be rigidly formed, as shown, to permit clearance over battery upper surface 102 during installation, while retaining a securement location, such as threaded aperture 26, close to mounted battery 100. After center strap 46 is aligned within slots 64, second leg 44 can be secured to bracket 20. Fastener 24 is passed through eye 45 of second leg 44 and secured in threaded aperture 22 of bracket 20.

Retention strap 40 is dimensionally formed so that as fastener 24 draws eye 45 and second leg 44 securely against bracket 20, a predetermined retention force is exerted by center span 46 against retainer 50. This retention force is the resultant of the bending moments and shear stresses induced in the center span 46 by bearing on the upper surface 54 of retainer 50. The magnitude of the retention force is determined by the cross-section of the center span 46, the strength of the material forming the strap 40, and the magnitude of the deflection induced in center span 46 as strap 40 is secured. This retention force is distributed over the battery upper surface 102 by the retainer lower surface 56. Each end of retainer 50 is reinforced by ribs 55 for rigidity in distributing the retention force to the upper surface 102 of battery 100. By distributing the retention force over the battery upper surface 102, this force is supported by the sidewalls 108 and multiple internal cell walls (not shown) of the battery 100.

Figure 10:
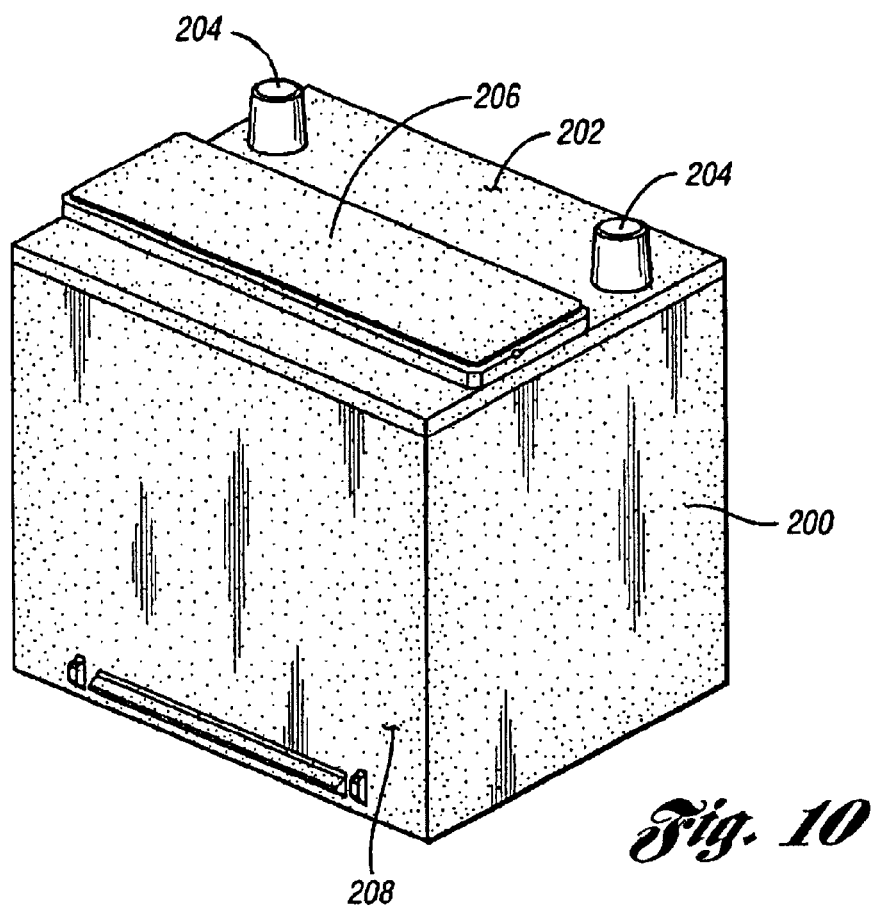
FIG. 10 is a perspective view of a second battery for use with the retention system of FIGS. 1–7.
Figure 11:
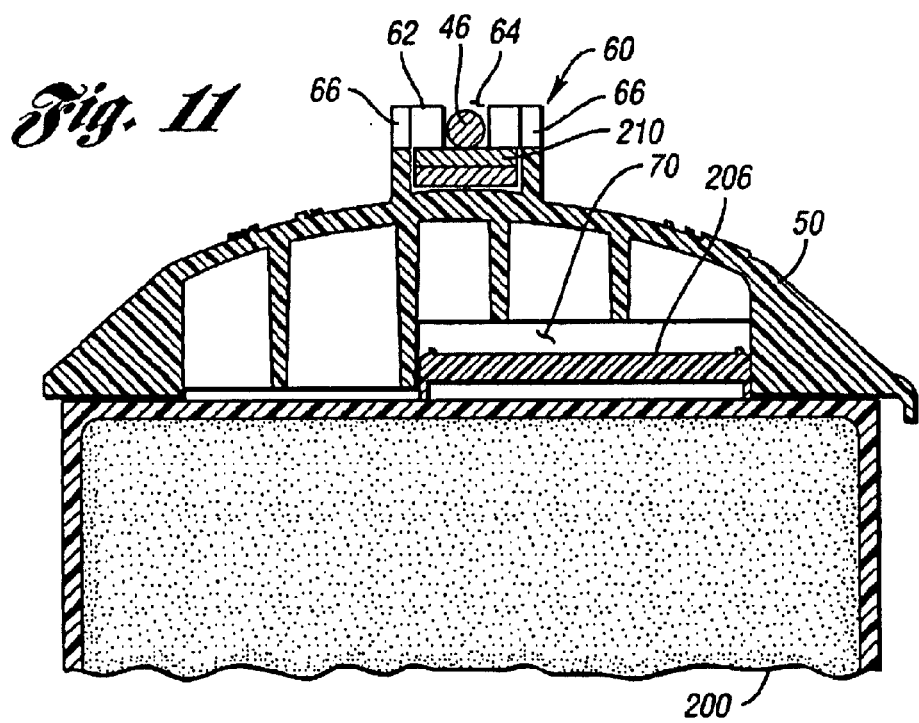
FIG. 11 is a cross-sectional view similar to FIG. 9, illustrating the second battery of FIG. 10.

Referring now to FIGS. 10–11, an alternative battery 200 is shown adaptable for retention by the retention system 10 according to the invention. Alternative battery 200 is shown as having an overall height less than battery 100. Battery cell caps 206 are also shown as being taller than, and differing in position from, battery cell caps 106. The remaining dimensions of alternative battery 200 are substantially the same as battery 100.

Cavity 70 of retainer 50 is adapted to receive the wider battery cell caps 206 of alternative battery 200. Alignment projection 78, rather than engaging gap 110, abuts the face of cell caps 206, and operates using the full width of the caps 206 and the cavity 70 in combination to align retainer 50 on alternative battery 200. Laterally extending ears 52 further align retainer 50 between terminals 204.

Due to the lesser overall height of alternative battery 200, the retention strap center span 46 will not exert the appropriate retention force on retainer 50. This situation is addressed by providing one or more spacers 210 between center span 46 of retention strap 40 and retainer 50 so that an equivalent retention force can be generated, in essence simulating the height of battery 100. The indexing notches 66 provided in well 60 indicate the height of spacers necessary to equate the height of a known alternative battery 200 to the height of battery 100. The spacers 210 are generally non-corrosive rigid disks placed in well 60 up to the lower edge of notches 66. In a preferred embodiment, the well is sized to closely receive spacers 210 that are the diameter of a coin, such as a nickel, which could be substituted if spacers 210 were not available.

The alternative battery 200 is thus mounted securely in the same fashion as battery 100. Retainer 50 is aligned over alternative battery 200, and with spacers 210 in place in well 60 of retainer 50, retention strap 40 is installed and secured using fastener 24. The retention strap 40 generates the appropriate retention force, which is distributed to the battery upper surface 202 by retainer 50.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A battery retention system comprising:

a top mount retainer formed for positive positioning on an upper surface of a battery having a first configuration, the top mount retainer being reinforced for bearing a downwardly clamping force without crushing and distributing the force over the upper surface of the battery; and a U-shaped rod adapted to fasten at each end to a battery support and span over the battery, oriented over the top mount retainer and exerting a downward force to secure the battery to the battery support, the force generated by a bending moment in the rod imposed by bearing on the top mount retainer, the top mount retainer being further adapted for positive positioning on a battery having a second configuration, and wherein the top mount retainer further comprises a well on an upper surface thereof for receiving the rod, the well having at least one spacer a spacer received therein for use when the retention system is used with the battery having the second configuration and whereby the spacer may be removed when used with the battery having the first configuration.

2. The battery retention system of claim 1, wherein the top mount retainer further distributes the force to structural sidewalls of the battery.

3. The battery retention system of claim 1, wherein the rod has a hook on a first end and an eye on a second end for attachment to the battery support.

4. The battery retention system of claim 1, wherein the battery having the first configuration includes cell caps on an upper surface thereof including beveled corners, and wherein the top mount retainer is further configured with a corresponding formation on an underside thereof for engaging the beveled corners to positively position the top mount retainer on the battery.

5. The battery retention system of claim 4, wherein the battery having the second configuration includes cell caps on an upper surface thereof lacking the beveled corners of the first configuration, and wherein the corresponding formation on the underside of the top mount retainer for engaging the beveled corners of the first configuration is further adapted to engage the cell caps of the second configuration to positively position the top mount retainer on the battery.

6. The battery retention system of claim 4, wherein the top mount retainer further comprises a depending lip on the underside thereof for positioning the top mount retainer relative to a sidewall of the battery.

7. The battery retention system of claim 1, wherein the well further includes an indexing indicator for identifying a height of spacer required to adapt the retention system to the battery having the second configuration.

8. The battery retention system of claim 1, wherein the battery having the second configuration includes upwardly projecting posts, and wherein the top mount retainer further includes outwardly extending ears for centering the top mount retainer between the posts.

9. The battery retention system of claim 1, wherein the well is adapted to receive a coin as the spacer.

10. A battery retention system comprising:

a top mount retainer formed for positive positioning on an upper surface of a battery having a first configuration and on an upper surface of a battery having a second configuration, the top mount retainer being formed with integral longitudinal ribs for distributing force to sidewalls of the battery and reinforced for bearing a downwardly clamping force without crushing and distributing the force over the upper surface of the battery said top mount retainer further comprising a well on an upper surface thereof for receiving a rod, the well having at least one spacer received therein for use when the retention is used with the battery having the second configuration and whereby the spacer may be removed when used with the battery having the first configuration; and wherein said rod is U-shaped and adapted to fasten at each end to a battery support and span over the battery, oriented over the top mount retainer and exerting a downward force to secure the battery to the battery support, the force generated by a bending moment in the rod imposed by bearing on the top mount retainer, wherein the top mount retainer is further formed with integral longitudinal ribs for distributing force to sidewalls of the battery.

* * * * *